(12) United States Patent
Aguera et al.

(10) Patent No.: US 12,091,195 B2
(45) Date of Patent: Sep. 17, 2024

(54) METHOD FOR ASSEMBLING A FUSELAGE PORTION OF AN AIRCRAFT, AND NOTABLY A NOSE OF THE AIRCRAFT

(71) Applicant: Airbus Operations (S.A.S.), Toulouse (FR)

(72) Inventors: Damien Aguera, Toulouse (FR); Arnaud Tonnele, Toulouse (FR); Salim Chalqi, Toulouse (FR); Yannick Lampure, Toulouse (FR); Alain Mady, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/065,741

(22) Filed: Dec. 14, 2022

(65) Prior Publication Data

US 2023/0192318 A1  Jun. 22, 2023

(30) Foreign Application Priority Data

Dec. 16, 2021 (FR) ...................................... 2113659

(51) Int. Cl.
*B64F 5/10* (2017.01)
*B64C 1/06* (2006.01)
*B64C 1/18* (2006.01)

(52) U.S. Cl.
CPC .............. *B64F 5/10* (2017.01); *B64C 1/0683* (2020.01); *B64C 1/069* (2013.01); *B64C 1/18* (2013.01)

(58) Field of Classification Search
CPC ......... B64F 5/10; B64C 1/0683; B64C 1/069; B64C 1/18
See application file for complete search history.

(56) References Cited

U.S. PATENT DOCUMENTS 5,806,797 A * 9/1998 Micale ...................... B64F 5/10
244/131
8,967,539 B2 * 3/2015 Siboni ...................... B64C 1/18
244/119

(Continued)

FOREIGN PATENT DOCUMENTS

| EP | 2 915 740 A1 | 9/2015 |
| FR | 2 930 521 A1 | 10/2009 |
| FR | 3 048 227 A1 | 9/2017 |

OTHER PUBLICATIONS

French Search Report for Application No. 2113659 dated Jul. 15, 2022.

*Primary Examiner* — Lawrence Averick
(74) *Attorney, Agent, or Firm* — KDW Firm PLLC

(57) ABSTRACT

An assembly method includes a succession of assembly steps of assembling fuselage components of the fuselage portion of the aircraft, for example the nose of the aircraft, to form a fuselage body, a mounting step of introducing, into the fuselage body thus formed, a floor module having at least a predetermined width, and which can be provided with items of equipment, and a fastening step of fastening the fuselage body to the floor module such that the floor module shapes the final shape of the fuselage body and the assembled fuselage portion is obtained, the floor module, which has at least a suitable predetermined width, making it possible, when it is incorporated into the fuselage body, to provide the fuselage body, which is slightly flexible, with its desired and definitive shape corresponding to the desired and definitive shape of the assembled fuselage portion.

8 Claims, 4 Drawing Sheets

(56) References Cited

U.S. PATENT DOCUMENTS

| | | | | |
|---|---|---|---|---|
| 9,290,259 | B2* | 3/2016 | Durand | B64D 43/00 |
| 9,688,379 | B2* | 6/2017 | Koch | B64C 1/14 |
| 10,093,406 | B2* | 10/2018 | Sankrithi | B64C 1/069 |
| 2006/0231681 | A1* | 10/2006 | Huber | B64C 1/22 |
| | | | | 244/119 |
| 2009/0228134 | A1* | 9/2009 | Munk | B64F 5/10 |
| | | | | 700/186 |
| 2011/0036946 | A1* | 2/2011 | Depeige | B64C 1/18 |
| | | | | 244/120 |
| 2011/0315821 | A1* | 12/2011 | Siboni | B64C 1/0683 |
| | | | | 244/119 |
| 2013/0082141 | A1* | 4/2013 | Koch | B64C 1/18 |
| | | | | 244/118.5 |
| 2014/0175224 | A1* | 6/2014 | Durand | B64D 43/00 |
| | | | | 29/428 |
| 2015/0102170 | A1 | 4/2015 | Koncz | |
| 2016/0311512 | A1* | 10/2016 | Sankrithi | B64C 1/069 |
| 2023/0150692 | A1* | 5/2023 | Joseph | B64C 5/02 |
| | | | | 29/897.2 |

* cited by examiner

METHOD FOR ASSEMBLING A FUSELAGE PORTION OF AN AIRCRAFT, AND NOTABLY A NOSE OF THE AIRCRAFT

TECHNICAL FIELD

The disclosure herein relates to a method for assembling a fuselage portion of an aircraft, and notably a nose of the aircraft.

BACKGROUND

A nose of an aircraft, in particular of a transport plane, corresponds to the front part of the aircraft comprising at least the cockpit and generally also, in the case of a transport plane, a fuselage part provided with lateral access doors at the front of the transport plane.

In general, a method for assembling such a nose of an aircraft includes assembling a plurality of particular fuselage components, which are manufactured in advance. Each of these fuselage components corresponds, in most cases, to a, for example, substantially semi-cylindrical longitudinal part (or portion).

The assembly method generally comprises a succession of assembly steps. It includes taking a particular initial fuselage component, generally a lower component which has to be arranged furthest towards the front of the nose, as initial component of the structure to be assembled, and then in successively assembling, step by step, other fuselage parts with the structure thus being assembled. These fuselage components are assembled by carrying out moulding/rigging operations which are lengthy and relatively complex. Some of the fuselage components comprise a floor part such that, when all of the fuselage components have been assembled together, the nose obtained directly incorporates a floor formed from different floor parts joined together during the assembly.

In order to carry out such an assembly method, it is necessary, in each step, to exactly align the fuselage component to be assembled, and, where appropriate, also the floor part that it comprises, with the already assembled structure. Moreover, it is necessary to provide a way for creating and maintaining the contour of the structure, in the desired shape, during assembly. This assembly method overall is therefore complex and generally has to be carried out in the same assembly station.

Such an assembly method can be improved.

SUMMARY

The disclosure herein relates to an improved method for assembling a fuselage portion of an aircraft, in particular of a transport plane, and notably a nose of the aircraft.

According to the disclosure herein, the assembly method comprises at least the sequence of the following steps:
- a succession of assembly steps of assembling a plurality of fuselage components of the fuselage portion of the aircraft so as to form a fuselage body;
- a mounting step of introducing, into the fuselage body thus formed, a floor module having at least a predetermined width; and
- a fastening step of fastening the fuselage body to the floor module, if necessary after deformation of the fuselage body, such that the floor module shapes the final shape of the fuselage body and the assembled fuselage portion is obtained.

Thus, by virtue of the disclosure herein, the floor module, which has at least a predetermined width as prescribed, makes it possible, when it is incorporated into the fuselage body, to provide the fuselage body, which is slightly flexible, with its desired and definitive shape. The definitive shape therefore does not have to be definitively established and maintained in the course of assembly, but it is established after the assembly of the fuselage components, during the incorporation of the floor module (that is to say in the mounting and fastening steps) which performs a shaper function, this notably making it possible to simplify the assembly method.

The method applies to any fuselage portion (which is closed circumferentially) of an aircraft, and notably to the nose of the aircraft.

In a preferred embodiment, the floor module is provided with crossmembers, and the fastening step includes at least fastening the two ends of at least some of the crossmembers of the floor module, on either side of the fuselage body, in each case at a fastening point.

Advantageously, the crossmembers are provided with a hole at each of their two ends, the two holes representing the fastening points, the centers of the two holes being remote from one another by the predetermined width.

Furthermore, advantageously, the fastening step includes, for each fastening point between an end of a crossmember and the fuselage body, superposing a hole made in the fuselage body with a hole made at the end of the crossmember, and then inserting a fastening element into the two holes thus superposed.

Preferably, for the fuselage body, at least some of the holes are made in fastening tabs which are secured to frames of the fuselage body.

Furthermore, advantageously, the succession of assembly steps includes taking a fuselage component as initial component of an assembly structure and in assembling in succession, step by step, the other fuselage components with this assembly structure.

Furthermore, in a particular embodiment, for the one part, the succession of assembly steps, and, for the other part, the mounting step and the fastening step are carried out in different assembly stations.

BRIEF DESCRIPTION OF THE DRAWINGS

The appended figures will make it easy to understand how the disclosure herein may be implemented. In these figures, identical references denote similar elements.

DETAILED DESCRIPTION

Figure 1:
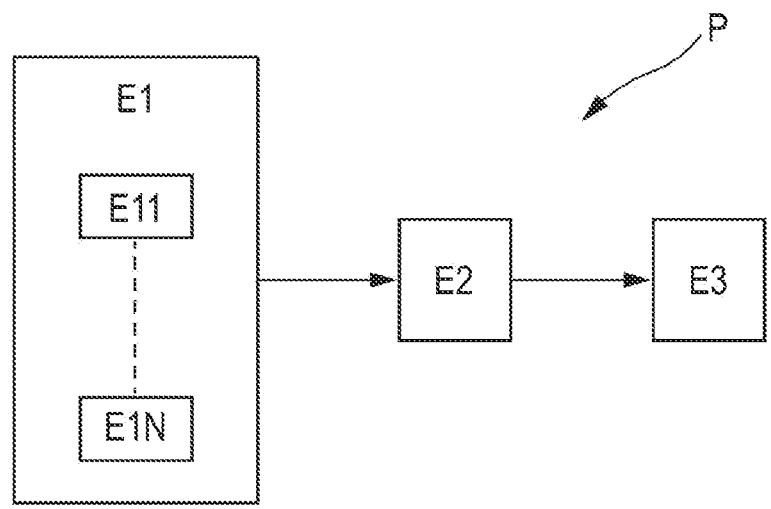
FIG. 1 is the block diagram of a particular embodiment of a method for assembling a nose of an aircraft.

The assembly method P shown schematically in FIG. 1 is a method for assembling a nose 1 (FIG. 2) of an aircraft, in particular of a transport plane. The nose 1 corresponds to the front part of the aircraft comprising at least the cockpit and generally also a fuselage part provided with lateral access doors at the front of the aircraft.

In the context of the disclosure herein, the assembly method may be applied to the assembly of fuselage portions of the aircraft other than the nose, as specified below.

The assembly method P comprises, first of all, a succession E1 of assembly steps E11 to E1N. N is an integer greater than 2 and is, for example, between 3 and 6.

Figure 3:
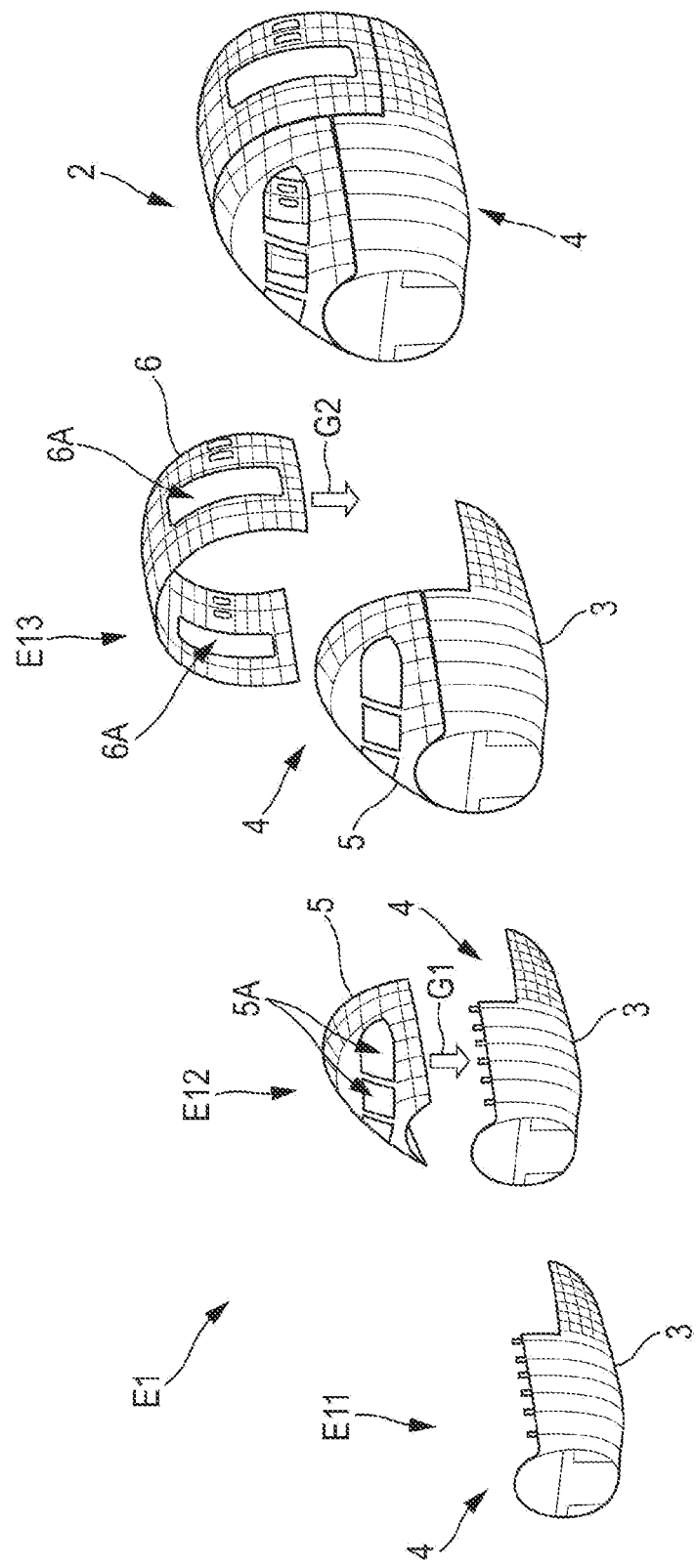
FIG. 3 shows four perspective views which illustrate successive steps of an example assembly operation for assembling fuselage components to form a fuselage body of a nose.

The various steps E11, E12 and E13 of the succession E1, as shown in a particular example in FIG. 3, include assembling a plurality of particular fuselage components 3, 5 and 6 so as to form a fuselage body 2 for the nose of the aircraft. These particular (that is to say separate and precisely defined) fuselage components 3, 5 and 6 are manufactured, in a customary manner, prior to the carrying out of the assembly method P.

In a preferred embodiment, the fuselage components 3, 5 and 6 to be assembled each have the shape of a part of a longitudinal portion, that is to say of a structural portion extended in the direction of the longitudinal axis X-X (FIG. 4) of the fuselage body 2, and also of the longitudinal axis of the nose and of the aircraft. In general, these fuselage components are partially cylindrical and notably substantially semi-cylindrical, and they correspond either to a bottom (or lower) (partially cylindrical and notably semi-cylindrical) part or to a top (or upper) (partially cylindrical and notably semi-cylindrical) part of a front part of the aircraft, as shown in the example of FIG. 3. The fuselage components 3, 5 and 6 notably comprise, in a customary manner, frames and stringers that are fastened together.

In the following description:
the term "front" denotes the direction defined towards the front of the fuselage body 2 (and therefore of the nose 1) in the direction illustrated by an arrow A in FIG. 4;
the term "rear" denotes the direction defined towards the rear of the fuselage body 2 (and therefore of the nose 1) in the direction opposite to that illustrated by the arrow A in FIG. 4;
the term "top" denotes the direction defined towards the top of the fuselage body 2 (and therefore of the nose 1) in the direction illustrated by an arrow B in FIG. 4; and
the term "bottom" denotes the direction defined towards the bottom of the fuselage body 2 (and therefore of the nose 1) in the direction opposite to that illustrated by the arrow B in FIG. 4.

The succession E1 of assembly steps of the assembly method P includes taking a fuselage component as initial component of an assembly structure (namely a structure in the course of assembly) and in assembling in succession, step by step, the other fuselage components with this assembly structure.

More precisely, in the example of FIG. 3, the succession E1 of assembly steps of the assembly method P comprises, successively:
an assembly step E11 of using the fuselage component 3 as initial component of the assembly structure 4. This fuselage component 3 corresponds to a substantially semi-cylindrical bottom component, intended for the bottom part furthest towards the front of the nose. It is, for example, intended to envelop the forward landing gear compartment of the aircraft and at least a part of the avionics bay. It may also be extended further longitudinally so as to envelop other parts of the aircraft;

an assembly step E12 of assembling the fuselage component 5 with the assembly structure 4 (formed of the fuselage component 3). This assembly step E12 includes bringing, as illustrated by an arrow G1, by way of customary movement structure (not shown and not described), the fuselage component 5 onto the assembly structure 4 which is installed in a fixed position in a customary assembly station (not shown). The fuselage component 5 is brought, towards the bottom, against the assembly structure 4, in a definitive position. In assembly step E12, the fuselage component 5 is then fastened, in a customary manner, to the assembly structure 4, namely to the fuselage component 3. The fuselage component 5 corresponds to a (substantially) partially semi-cylindrical top component, for the top part furthest towards the front of the nose. The fuselage component 5 is intended to envelop at least a part of the cockpit. It comprises, notably, openings 5A for windscreen panes of the cockpit; and an assembly step E13 of assembling the fuselage component 6 with the assembly structure 4 (formed of the fuselage components 3 and 5). This assembly step E13 includes bringing, as illustrated by an arrow G2, by way of customary movement structure (not shown and not described), the fuselage component 6 onto the assembly structure 4. The fuselage component 6 is brought against the assembly structure 4 in a definitive position. In assembly step E13, the fuselage component 6 is then fastened to the assembly structure 4 in a customary manner. The fuselage component 6 corresponds to a substantially semi-cylindrical top component, for the top part furthest towards the rear of the nose. The fuselage component 6 is intended to envelop a part of the cockpit (namely the part not enveloped by the fuselage component 5) and/or a crew rest area and/or a part of the passenger cabin of the aircraft. It comprises, notably, openings 6A for lateral access doors at the front of the aircraft.

The assembly structure 4 obtained at the end of the succession E1 of assembly steps represents the fuselage body 2. The fuselage body 2 represents a structure having an elongate (circumferentially closed) contour which defines a partially closed internal space, provided at least with one opening, and notably only with one opening at the rear when it is intended for a nose 1.

The succession E1 of assembly steps is carried out, preferably, in one and the same assembly station.

The assembly method P also comprises a mounting step E2 (FIG. 1) carried out after the succession E1 of assembly steps.

Figure 2:
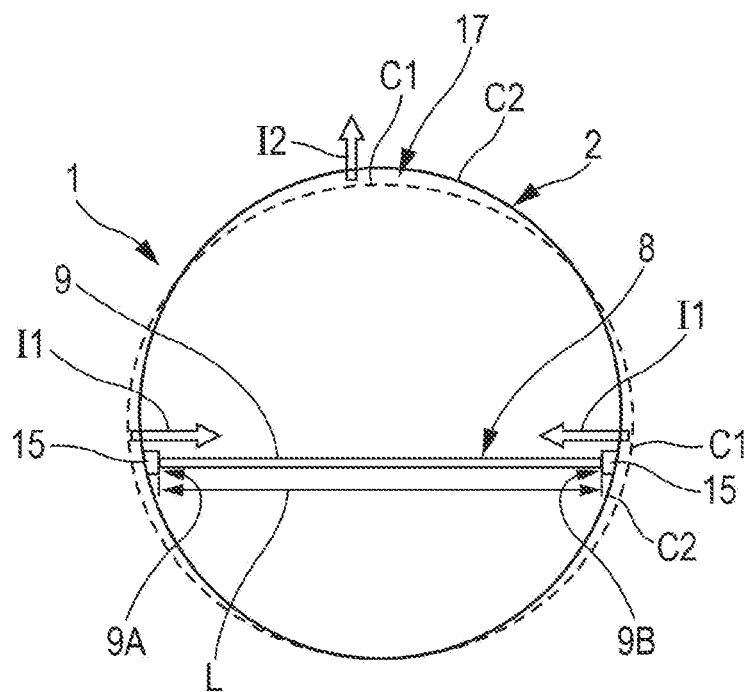
FIG. 2 is a schematic view, in cross section, of a nose of an aircraft, the nose having been assembled in accordance with the assembly method.
Figure 4:
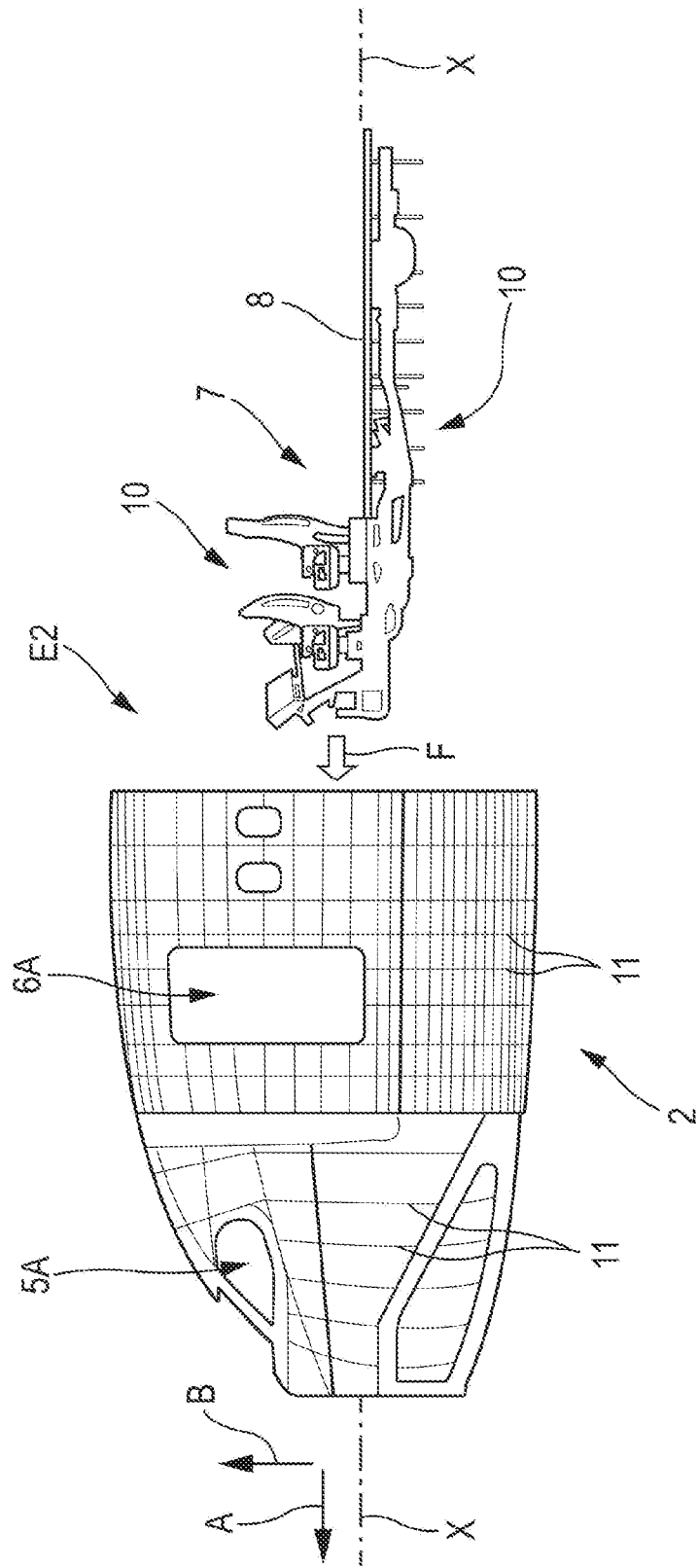
FIG. 4 is a side view of the fuselage body into which a floor module will be introduced, in accordance with a mounting step of the assembly method.
Figure 5:
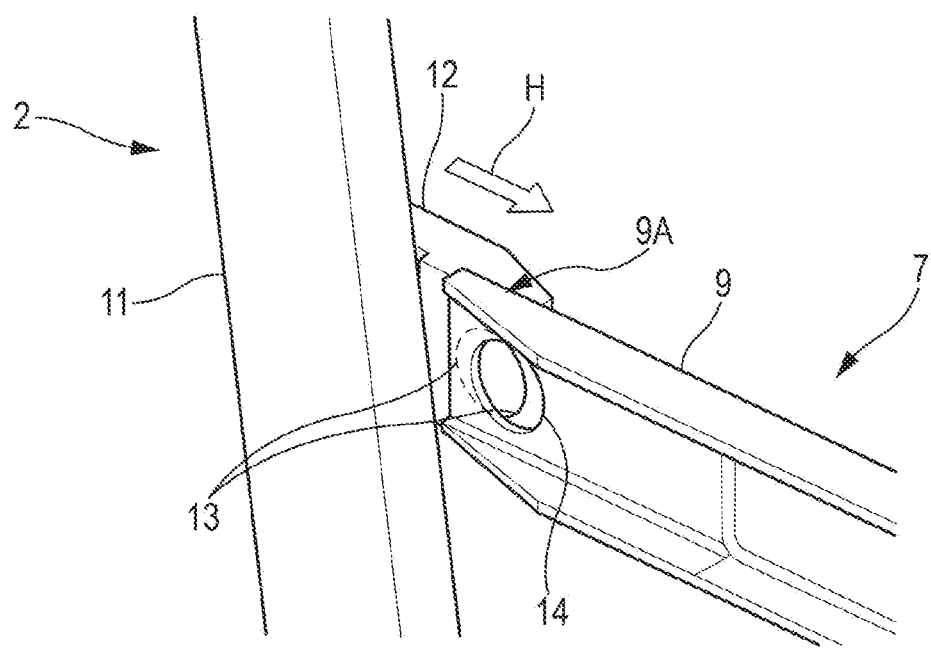
FIG. 5 is a partial perspective view of an end of a crossmember of the floor module, which end is being fastened to a fastening tab of a frame of the fuselage body.
Figure 6:
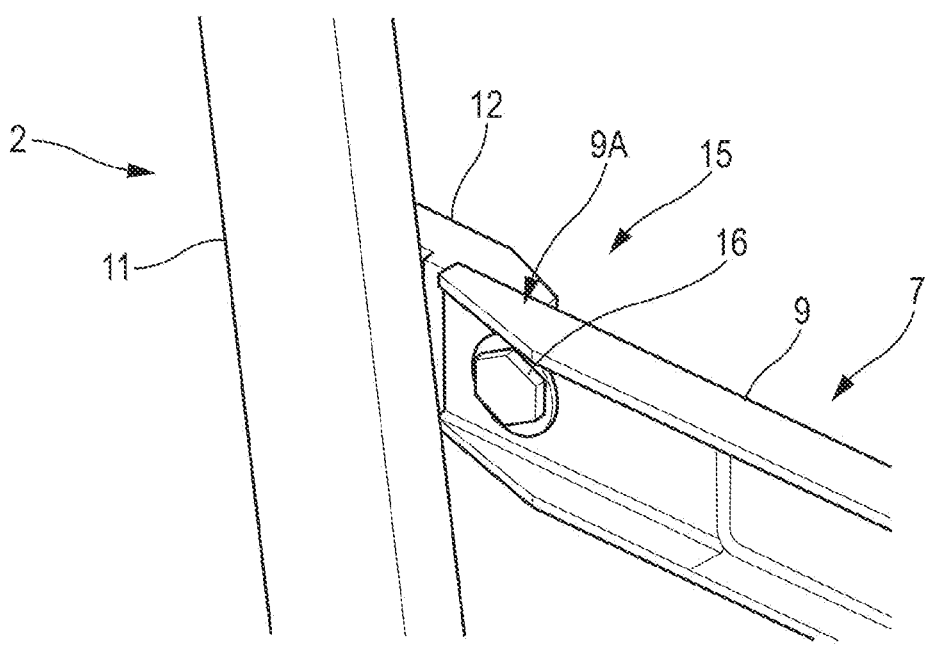
FIG. 6 is a view similar to that of FIG. 5, in which the fastening has been carried out.

The mounting step E2 includes introducing a floor module 7 into the fuselage body 2, as shown in FIG. 4. The floor module 7 comprises a floor 8, of the customary type, provided notably with crossmembers 9 (FIGS. 2, 5 and 6). The floor 8 generally comprises a structure formed of a set of crossmembers and longerons (not shown) that are connected together, for example in the form of a checkered network, and possibly of a planar support arranged on this structure. The floor 8 has a prescribed size, as specified below.

In a particular embodiment, the floor module 7 comprises only the floor 8.

Furthermore, in a preferred embodiment, the floor module 7 also comprises, in addition to the floor 8, one or more sets 10 of equipment. This equipment corresponds, for example, to pedals for the pilots, to at least one of the seats for the pilots, to at least a part of the instrument panel and/or to other customary equipment in the cockpit, and also to electrical cables and/or to data communication cables, etc. This or these sets 10 of equipment are mounted on and/or under the floor 8. Depending on the envisaged embodiment, it is possible to provide one or more sets 10 with more or fewer items of equipment.

This preferred embodiment thus provides for the equipment to be installed on the floor module 7 prior to incorporation thereof into the fuselage body 2, this affording the advantage of facilitating the installation of this equipment notably for reasons of reduced bulk outside the fuselage body 2 and of limiting the time required for assembling the nose since it is no longer necessary to install this equipment.

The floor module 7, and more precisely the floor 8 thereof, has a prescribed size, namely a prescribed width, as specified below.

The mounting step E2 is carried out with the aid of conventional structure for moving the floor module 7 in order to introduce it into the fuselage body 2, in the direction illustrated by an arrow F in FIG. 4 (that is to say from the rear towards the front), so as to bring it into the required position in the fuselage body 2.

The assembly method P also comprises a fastening step E3 (FIG. 1) carried out after the mounting step E2.

The fastening step E3 includes fastening the floor module 7, thus introduced into the fuselage body 2, to the fuselage body 2. The fastening of the floor module 7 includes, notably, fastening at least some of the crossmembers 9 of the floor module 7, and preferably all of the crossmembers 9 of the floor module 7, to parts of the fuselage body 2 and, preferably, to frames 11 (FIGS. 5 and 6) of the fuselage body 2. The crossmembers 9 to be fastened have a predetermined width L (FIG. 2).

To this end, provision is made for each of the two ends 9A and 9B (FIG. 2) of the crossmembers 9 under consideration to be fastened to a frame 11 of the fuselage body 2, at a fastening point 15 (FIG. 6) specified below. In a preferred embodiment, each of the two ends of the crossmembers 9 is fastened to a fastening tab 12 which is secured to the frame 11, as shown in FIGS. 5 and 6 for the end 9A. The fastening tab 12, which is, for example, welded or screwed to the frame 11, is provided with a (round) hole 13 intended to cooperate with a similar (round) hole 14 made at the end 9A of the crossmember 9. The fastening includes superposing, if this is necessary, the hole 13 of the fastening tab 12 with the hole 14 of the crossmember 9. In order to bring the hole 13 of the fastening tab 12 to the position of the hole 14 of the crossmember 9, an action may be exerted on the frame 11 of the fuselage body 2 which is slightly flexible, in the direction illustrated by an arrow H in FIG. 5.

When the desired position has been reached, the fastening includes simply introducing a fastening element 16 into the superposed holes 13 and 14 of the end 9A of the crossmember 9 and of the fastening tab 12. This fastening element 16 may be a bolt or any other fastening element provided with a shaft that is able to pass through the two holes 13 and 14 and implement the fastening. The crossmembers 9 (and therefore the floor module 7) can thus be fastened to the fuselage body 2 in a rapid and simple manner. The fastening point 15 corresponds to the position of the center of the fastening element 16 and of the holes 13 and 14, when the fastening element 16 is introduced into the superposed holes 13 and 14.

As indicated above, the floor module 7 has a predetermined prescribed shape, namely at least a prescribed width serving as (lateral) reference. More particularly, at least some of the crossmembers 9, and preferably all of the crossmembers 9, connected together within the floor module 7 have the same suitable prescribed length L (FIG. 2). The length L corresponds to the length between the centers of the holes provided at the two ends 9A and 9B of the crossmember 9, which are intended for the fastening of the crossmember 9, such as the hole 14 provided at the end 9A, which is shown in FIG. 5. This suitable prescribed length L is such that the fastening of the fuselage body 2 to the crossmembers 9 makes it possible to bring the fuselage body 2 to the suitable position in respect of the floor 8.

To this end, it may be necessary to act on the fuselage body 2, in the direction illustrated by the arrow H (FIG. 5), so as to bring it to the position required by the fastening hole 14 of the crossmember 9. In fact, although the fuselage body 2 initially has a suitable shape, it is possible that it collapses very slightly due notably to gravity or is deformed very slightly in some other way, so as to have, prior to the fastening of the floor module 7, an external contour such as the contour C1 shown by dashes in FIG. 2.

The fuselage body 2 has a certain degree of flexibility, for example up to 1 or 2 mm, which allows a slight deformation in the direction of arrows 11 (similar to the arrow H) in FIG. 2 so as to bring it into the required position. This required position is defined by the length L of the crossmembers 9 and the position of the fastening points 15 with respect to the fuselage body 2.

It has been proven that bringing the central part of the fuselage body 2 into the shape prescribed by the floor 8 and required for the fuselage body 2 at this location has the effect that the rest of the fuselage body 2 also adopts its required shape, illustrated by a contour C2 drawn with a solid line in FIG. 2, and notably at its top part 17 (where the contour is rectified as illustrated by an arrow 12). The contour C2 therefore represents the desired definitive shape, obtained simply through the introduction and the fastening of the floor module 7, without any other shaping action.

The floor module 7 thus has several functions. Specifically, in addition to having a customary structural function for supporting loads and also to allowing, in a customary manner, the installation of systems which are attached to the floor 8, it has a supplementary function, namely a function as shaper for the fuselage body 2 (and therefore for the nose 1), by being configured to bring the fuselage body 2 (and thus the nose 1) into the desired definitive shape (contour C2).

In a simplified embodiment, the various steps of the assembly method P, as described above, are carried out in one and the same assembly station.

Furthermore, in a preferred embodiment of the assembly method P, for the one part, the succession E1 of assembly steps, and, for the other part, the mounting step E2 and the fastening step E3 are carried out in two different assembly stations. This preferred embodiment makes it possible to carry out different steps of the method in parallel in different assembly stations, this making it possible to facilitate the simultaneous assembly of several noses and to reduce the time required for assembling the nose (and therefore also the aircraft comprising this nose).

The assembly method P has been described above, by way of preferred embodiment, for the assembly of the nose of the aircraft. However, in the context of the disclosure herein, the assembly method may be applied to other longitudinal fuselage portions of an aircraft, and notably to any circumferentially closed fuselage portion comprising at least one longitudinal opening.

The assembly method P as described above has numerous advantages. In particular:
- it makes it possible to use the floor module 7 as a reference and as a shaper;
- it does not require the implementation of moulding/rigging operations during the incorporation of the floor module 7;
- it makes it possible to fasten the floor module 7 to the fuselage body 2, by way of simple fastening;
- its implementation can be repeated as much as desired; and
- some of the steps of the assembly method P can be carried out in different assembly stations.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a fuselage portion of an aircraft, comprising at least a sequence of steps of:
   a succession of assembly steps comprising assembling a plurality of fuselage components of the fuselage portion of the aircraft to form a fuselage body;
   a mounting step comprising introducing, into the fuselage body thus formed, a floor module having at least a predetermined width; and
   a fastening step comprising fastening the floor module to the fuselage body;
   wherein the fuselage body is a deformed state prior to the fastening of the floor module to the fuselage body;
   wherein the fastening of the floor module to the fuselage body deforms the fuselage body from the deformed state into a final shape of the fuselage body and the assembled fuselage portion is obtained; and
   wherein deformation of the fuselage body from the deformed state into the final shape is obtained through introduction of the floor module into the fuselage body during the mounting step and through fastening of the floor module to the fuselage body without any other shaping action.

2. The method according to claim 1, wherein:
   the floor module comprises crossmembers; and
   the fastening step comprises at least fastening two ends of at least some of the crossmembers of the floor module, on either side of the fuselage body, in each case at a fastening point.

3. The method according to claim 2, wherein the crossmembers comprise a hole at each of their two ends, the two holes representing the fastening points, the centers of the two holes being remote from one another by the predetermined width.

4. The method according to claim 2, wherein the fastening step comprises, for each fastening point between an end of a crossmember and the fuselage body, superposing a hole made in the fuselage body with a hole made at an end of the crossmember, and then inserting a fastening element into the two holes thus superposed.

5. The method according to claim 4, wherein, for the fuselage body, at least some of the holes are made in fastening tabs which are secured to frames of the fuselage body.

6. The method according to claim 1, wherein the succession of assembly steps comprises taking a fuselage component as an initial component of an assembly structure and assembling in succession, step by step, other fuselage components with this initial component of the assembly structure.

7. The method according to claim 1, wherein the succession of assembly steps are carried out in one or more different assembly stations from where the mounting step and the fastening step are carried out.

8. The method according to claim 1, wherein the fuselage portion corresponds to a nose of the aircraft.

* * * * *